US006731845B1

(12) United States Patent
Gerdt

(10) Patent No.: US 6,731,845 B1
(45) Date of Patent: *May 4, 2004

(54) PANORAMIC VISUAL SYSTEM FOR NON-ROTATING STRUCTURES

(75) Inventor: David William Gerdt, Charlottesville, VA (US)

(73) Assignee: Sperry Marine Inc., Charlottesville, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 07/540,999

(22) Filed: Jun. 19, 1990

(51) Int. Cl.⁷ .............................................. G02B 23/08
(52) U.S. Cl. ........................ 385/116; 385/33; 359/402; 359/403
(58) Field of Search .......................... 350/96.15, 96.18, 350/96.2, 96.22, 96.24, 96.25, 540, 541

(56) References Cited

U.S. PATENT DOCUMENTS

| | | | | |
|---|---|---|---|---|
| 3,985,424 A | * | 10/1976 | Steinacher | 350/96.25 |
| 4,027,945 A | * | 6/1977 | Iverson | 350/96.22 |
| 4,487,646 A | * | 12/1984 | Murray et al. | 350/96.25 X |
| 4,695,129 A | * | 9/1987 | Faessen et al. | 350/96.25 |
| 4,815,816 A | * | 3/1989 | Schneider | 350/96.25 |
| 4,830,446 A | * | 5/1989 | Margolin | 350/96.25 X |

\* cited by examiner

Primary Examiner—John D. Lee
(74) Attorney, Agent, or Firm—Seymour Levine; Gerald L. Lett

(57) ABSTRACT

A panoramic view of the world surrounding a stationary mast of a submarine is provided by a plurality of small windows disposed circumferentially around the mast and a corresponding plurality of lenses for imaging the fields of view thereof onto coherent fiber optic image bundles. The fields of view of the lenses overlap to provide a complete panoramic view. The exit ends of the image guides are arranged to form a polygonal opening so that a replica of the panoramic view is provided within the opening. A mirror or prism rotating within the opening scans the view replica and directs the scanned image to a stationary television camera. A derotating prism in the path of the directed scanned image rotates at one-half the angular displacement of the image director to compensate for rotation imparted to the scanned image by the image director.

10 Claims, 4 Drawing Sheets

PANORAMIC VISUAL SYSTEM FOR NON-ROTATING STRUCTURES

BACKGROUND OF THE INVENTION

1. Field of the Invention

The invention relates to systems for providing a panoramic view of an environment. The invention is related to submarine masts, particularly of the non-rotating, non-hull penetrating type.

2. Description of the Prior Art

Traditionally, submarines include a rotary periscope mast that provides a continuous 360° scan or pan of the outside environment of the submarine. Such periscopes require a marine rotating mast seal which is difficult to construct and maintain. Present day submarines also include a fixed, non-rotating, non-hull penetrating intelligence and signal gathering mast containing integrated electronic intelligence gathering systems. In use, such an intelligence gathering mast normally does not permit the simultaneous use of the traditional periscope mast. The intelligence or signal gathering mast may be required to operate over many hours, during which time there cannot be a simultaneous use of the periscope mast requiring above water exposure. This is because the signal gathering capability of the intelligence gathering mast is compromised by the metals contained in the periscope mast which distort the weak electromagnetic fields or signals that the intelligence gathering mast is endeavoring to detect. It is appreciated, however, that for threat warning purposes and general surveillance, a panoramic system is desired that pans through 360° permitting an operator to obtain a complete visual panoramic search of the outside environment surrounding the submarine while the traditional optical rotary periscope is unusable. It is furthermore desirable to include, if possible, such a visual panoramic scanning system within the intelligence gathering mast.

The intelligence gathering mast is required to be small in visual and radar cross-section and as a result tends to be densely occupied with components such as antennas, and the like. In such a mast the central or axial space thereof tends to be crowded with equipment, which space may otherwise have been utilized for the visual panning system. In such a mast only extremely limited off-center and off-axial, relatively remote internal space is available for the visual system. Known panning systems tend to be large and heavy, requiring components to be axially located within a mast. Such prior art panning systems additionally tend to include large numbers of moving parts, thereby reducing the reliability of the system and increasing the required maintenance thereof. It is appreciated that the inside volume of an intelligence gathering mast is extremely sensitive to the placement, volume, composition and type of metallic components disposed therein. Known systems which may be utilized to add visual capability to an intelligence gathering mast include numerous metallic parts and electronic components that cannot be relocated to a remote space.

A non-rotary visual mast design includes panoramic windows surrounding the mast forming a section thereof. A centrally or axially located camera is utilized to pan through the panoramic windows as desired through 360°. Such a system suffers from the disadvantages discussed above with respect to prior art panning systems and, additionally, could not be incorporated into the tightly packed integrated electronic surveillance mast where the central and axial locations are unavailable.

Another non-rotary visual capability mast design is to include a plurality of windows circumferentially around the mast, each providing a sufficiently wide angle field of view to respective fixed cameras so as to provide a full 360° scene. Such an arrangement requires multiple cameras and complex pan processing to provide the desired result. The multiple camera design tends to be excessively bulky and expensive, as well as requiring undesirably large power consumption and dissipation. Furthermore, plural video data cables from the cameras overburden the limited space of the mast.

Thus it is appreciated, that conventional methods of forming visual surveillance over 360° have utilized scanning television cameras with a single monitor or multiple overlapping field of view cameras with multiple monitors. Both of these techniques are undesirable, especially for military applications, because of the presence of moving parts in the former case and the large size and complexity in the latter case.

SUMMARY OF THE INVENTION

The above-described disadvantages of the prior art are overcome by a panoramic visual system comprising a plurality of lenses disposed about the periphery of a structure, each lens providing a field of view that at least abuts the fields of view of the lenses adjacent thereto. Thus, the lenses provide a 360° coverage of the scene. The lenses image the respective fields of view onto the ends of a plurality of respective image relays. The other ends of the image relays are disposed adjacent each other in a closed arrangement, with adjacent relayed images corresponding to adjacent lenses. The closed arrangement of adjacent relayed images forms a continuous panoramic replica of the 360° scene viewed by the lenses. Thus, a continuous pan of the environment surrounding the structure can be accessed by a continuous rotary scan of the relayed images assembled into the closed arrangement.

Preferably, a rotating mirror or prism directs the scanned panoramic image through a relay lens into a television camera. An image intensifier may be utilized at the input of the camera to increase the dynamic range of the system and to provide automatic light level control. Means are included to compensate for the rotation imparted to the image impinging on the camera by the rotating mirror or prism. Preferably, a derotating prism geared to the image directing mirror or prism and disposed in the path of the rotating image is utilized for this purpose.

For purposes of integration of the visual system into an intelligence gathering mast, the lenses, image relays, and all attaching hardware are, preferably, constructed of dielectric materials.

DESCRIPTION OF THE PREFERRED EMBODIMENT

Figure 1:
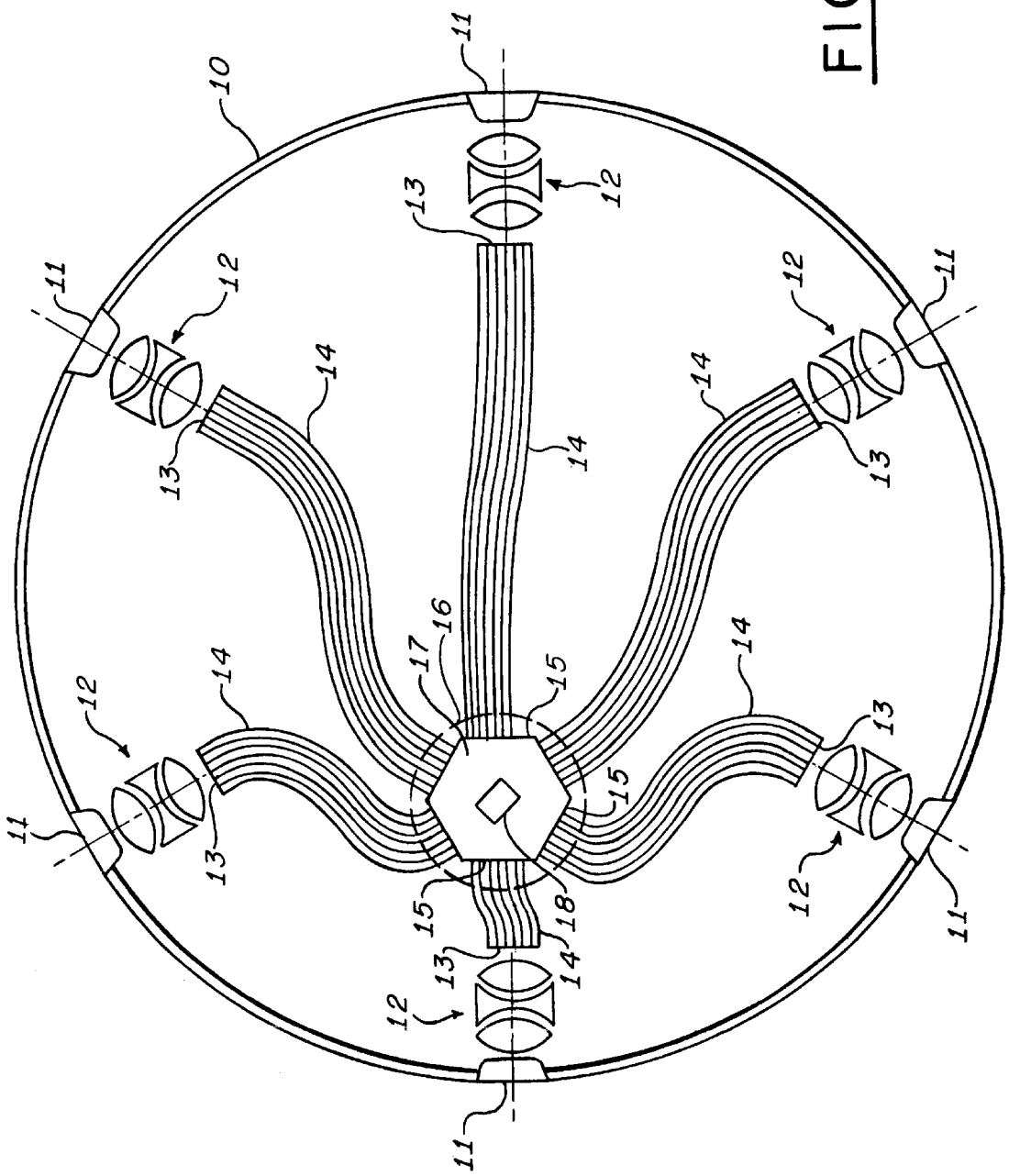
FIG. 1 is a plan view of the interior of a non-rotary submarine mast illustrating the panoramic visual system of the present invention.

Referring to FIG. 1, an interior plan view of a submarine mast with a panoramic visual system implemented in accordance with the invention is illustrated. The mast includes a housing 10 with a plurality of windows or image ports 11 therein to provide a panoramic view of the surrounding environment of the submarine. The windows 11 are preferably small, durable and pressure proof and present day marine technology provides windows that are anti-fouling, scratch resistant and water shedding. Adjacent to each window 11 is an imaging lens 12 for providing a view of the outside world. The field of view of each lens 12 slightly overlaps the fields of view of the lenses adjacent thereto providing total circumferential coverage. The lenses 12 form a large field of view ring of small apertures about the circumference of the structure 10.

Each of the lenses 12 images its field of view of the outside world onto one end 13 of an image light guide 14. Preferably, each of the light guides 14 is implemented by a coherent fiber optic bundle image relay. The image formed on the end 13 of each of the image relays 14 is conveyed therethrough with negligible attenuation to an exit end or face 15 thereof. The exit ends 15 of the image guides 14 are clamped in an alignment fixture 16 which arranges the ends 15 to form a polygonal group with the images from adjacent image ports 11 arranged adjacent thereto in the group of exit ends 15. The exit ends 15 of the image guides 14 form a polygonal opening 17 within which a continuous panoramic view of the outside world exists.

FIG. 1 illustrates six groupings of windows 11, lenses 12 and image guides 14 forming a hexagonal opening 17. The configuration illustrated in FIG. 1 may be denoted as a "hexapus" because of the resemblance thereof to an octopus. Other numbers of groupings such as 4 or 8 may be utilized with the opening 17 arranged in a square or octagon, respectively. Each image is arranged adjacent its image port neighbors, so that an outside continuous panoramic view of the world exists within the polygonal opening 17. Each of the image bundles 14 may be as long as required for the available space and may be twisted and positioned into desired locations without affecting the image guided therein.

The lenses 12 and image guides 14 are arranged so that each exit face 15 provides an image representing a 60° horizontal field of view. Thus, the grouping of the six bundles 14 into the hexagonal opening 17 provides a continuous view of the outside world. Various arrangements may be effected for accessing the panoramic view. If the head of an observer were positioned within the opening 17 and rotated, the panoramic view of the world on the exit faces 15 would be accessed. However, since the hexagonal opening 17 is small, a rotating image director 18 is illustrated which directs the image to a television camera in a manner to be described.

Figure 2:
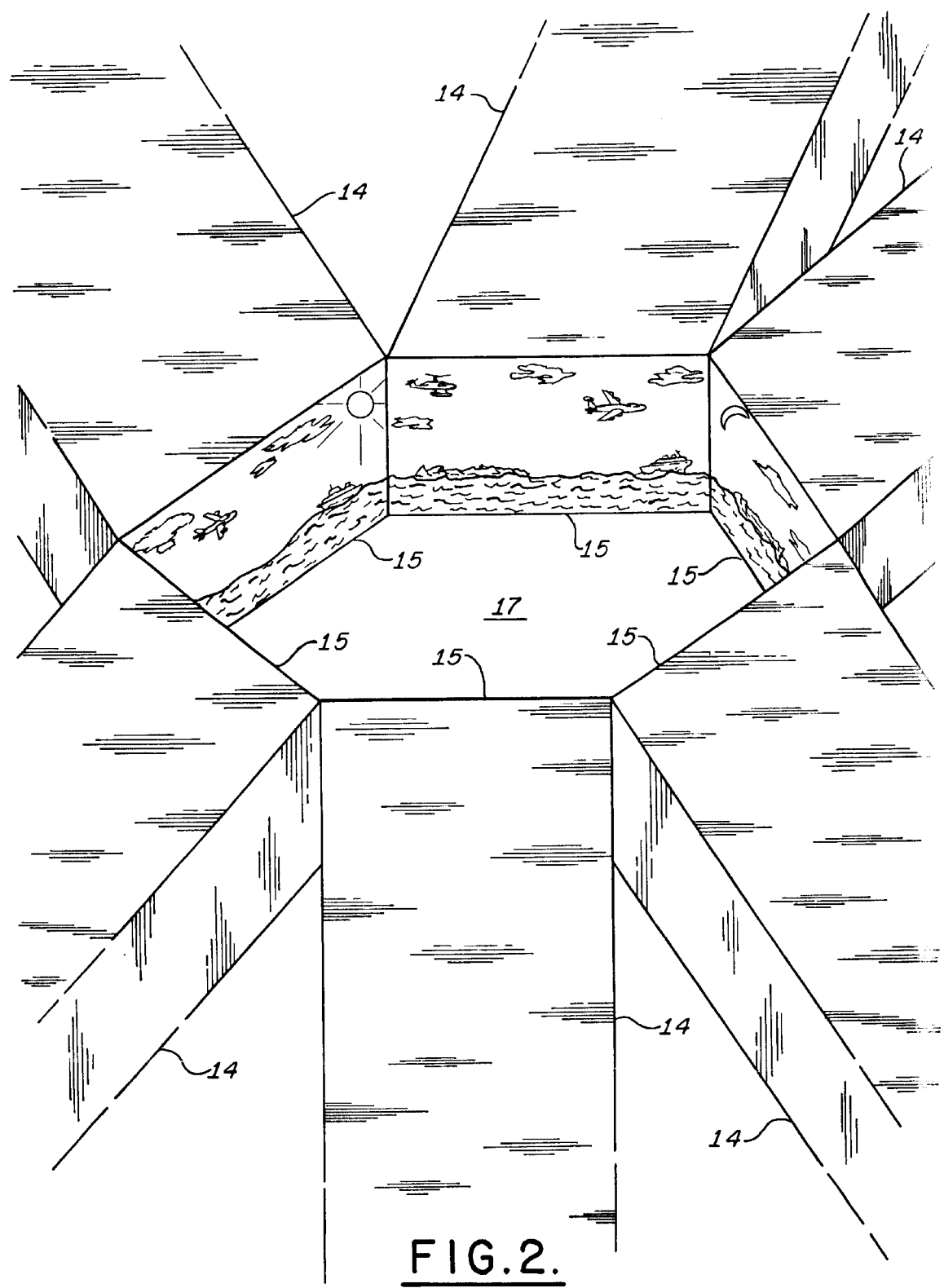
FIG. 2 is an enlarged three-dimensional view of a portion of the system of FIG. 1.

Referring to FIG. 2, in which like reference numerals indicate like components with respect to FIG. 1, an enlarged view of the hexagonal opening 17 of the hexapus of FIG. 1 is illustrated. The six image bundles 14 are shown assembled to form the hexagonal opening 17 containing the illustrated panoramic view of a horizontal slice of the world. The view is preferably accessed in a manner now to be described.

Figure 3:
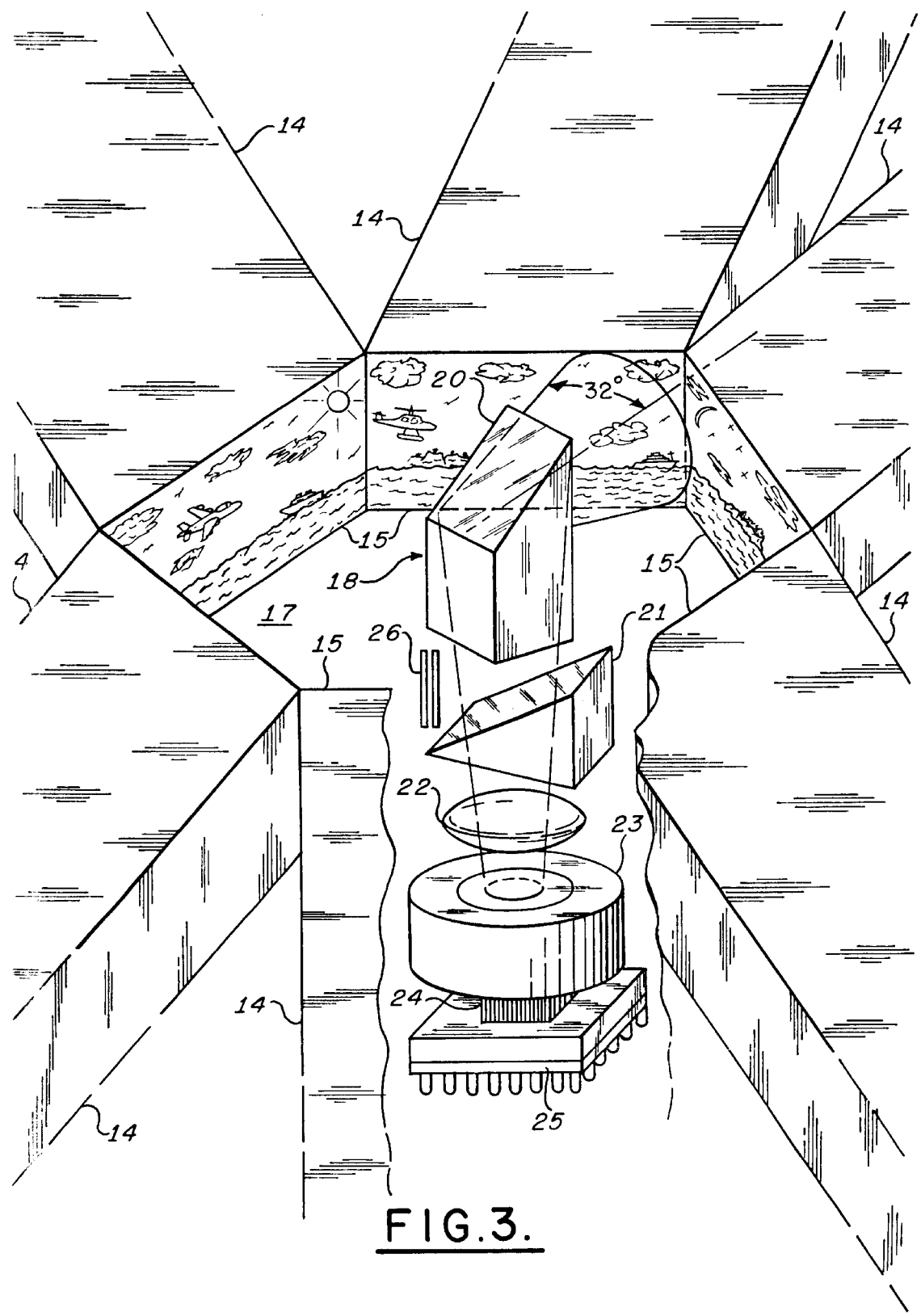
FIG. 3 is a three-dimensional view similar to that of FIG. 2 illustrating further details of the preferred embodiment of the invention.

Referring to FIG. 3, in which like reference numerals indicate like components with respect to FIGS. 1 and 2, the hexagonal opening 17 is illustrated with a preferred mechanism 18 for accessing the panoramic image disposed therein. The image accessing mechanism 18 comprises a rotating director prism or mirror 20 that directs the images from the exit ends 15 of the light guides 14 through a derotating prism 21 via a lens 22 onto an image intensifier 23. The intensified image from the image intensifier 23 is directed through an image relay 24 to a focal plane array of a solid state television camera sensor. The mirror or prism 20 scans or pans the panoramic image with a field of view section and directs the image via the lens 22 to form a real-image of the field of view section of the panoramic view onto the television camera image sensor 25. The lens 22 is of such magnification that, for example, a 32° field of view section is selected for viewing by the television camera 25. Thus, the mirror or prism 20 is utilized by the lens 22 to image the desired field of view (32°) onto the image intensifier 23. The exit ends 15 of the six image bundles 14 form the hexagon 17 around the panning mirror or prism assembly 20. The rotation of the mirror or prism 20 permits access to any portion of the 360° pan image formed by the hexagonal array of image bundles.

Since both the panoramic hexagonal bundle comprised of the light guides 14 and the television system comprised of the components 22–25 are fixed, the rotating mirror or prism director 20 would rotate the image of the world as the director 20 is panned within the hexagon 17. The picture on a television monitor would rotate 360° as the panning mirror 18 views the entire horizontal field. The derotation prism 21 compensates for the rotation of the image caused by the fixed horizontal field of view and the fixed camera system. A 2:1 gearing 26 mechanically couples the directing mirror or prism 18 to the derotation prism 21. The derotation prism 21 is geared at half rotational speed relative to the rotation of the mirror or prism director 18. Thus, the mirror or prism director 18 rotates at θ while the prism 21 derotates at θ/2. The construction and functioning of a derotation mechanism is conventional. The derotation prism 21 is similar to technology described in U.S. patent application Ser. No. 712,918, filed Mar. 18, 1985 entitled "Fiber Optic Rotary Joint" by L. H. Gilligan, now abandoned.

Alternatively, a counter-rotating CRT could be utilized to compensate for the image rotation as well as various image processing procedures. The use of the derotation prism 21 as described is, however, considered the simplest solution.

The lens 22 is a relay lens that forms the image directed by the directing mirror or prism 20 onto the input image plane of the image intensifier 23. If an image intensifier is not utilized, the relay lens 22 forms the image directly onto the input image plane of the television camera. In FIG. 3, the image would be coupled to the image relay input 24 of the camera. Alternatively, a zoom lens or multi-field of view turret of lenses could also be utilized to form the image. This arrangement would provide various fields of view to a monitor utilized with the camera.

The focal plane array 25 is part of a solid state camera utilized in the present system. The camera sensor array 25 may be implemented in CCD, CID or like technology. The focal plane array 25 resolves the image into pixels thereby converting the image to electrical signals. The image relay 24 of the camera may comprise a coherent fiber optic image relay, relay lenses or an image reducer. The camera utilized may be of an electronic automatic light control type, or all light level type. The camera utilized may be monochrome or color. Since a real image is provided to the camera system 23–25, an eye piece could be substituted therefor where a camera was not required.

The image intensifier 23 is coupled to the solid state focal plane array 25 via the fiber optic input 24 of the camera. The image intensifier 23 need not be utilized in the system since the television focal plane array 25 can receive the image directly from the lens 22. The image intensifier 23 extends the dynamic range of the system to low light level conditions. The image intensifier 23 can also be utilized to provide automatic light level control by gating the photo-cathode thereof in the manner described in U.S. Pat. No. 4,882,481, issued Nov. 21, 1989, entitled "Gated Pulse Intensifier Gain Control" by L. H. Gilligan and D. W. Gerdt. Said U.S. Pat. No. 4,882,481 is assigned to the assignee of the present invention.

Present day image intensifiers only provide monochromatic imagery. An image intensified color television camera could, however, be utilized by incorporating the techniques disclosed in co-pending U.S. patent application Ser. No. 298,396, filed Jan. 18, 1989, entitled "Intensified Color Television Camera" by L. H. Gilligan and T. A. Tucker. Said Ser. No. 298,396 is assigned to the present assignee. If the image intensifier 23 is not utilized, any conventional color or monochromatic television camera could be utilized to receive the image directly from the lens 22.

Figure 4:
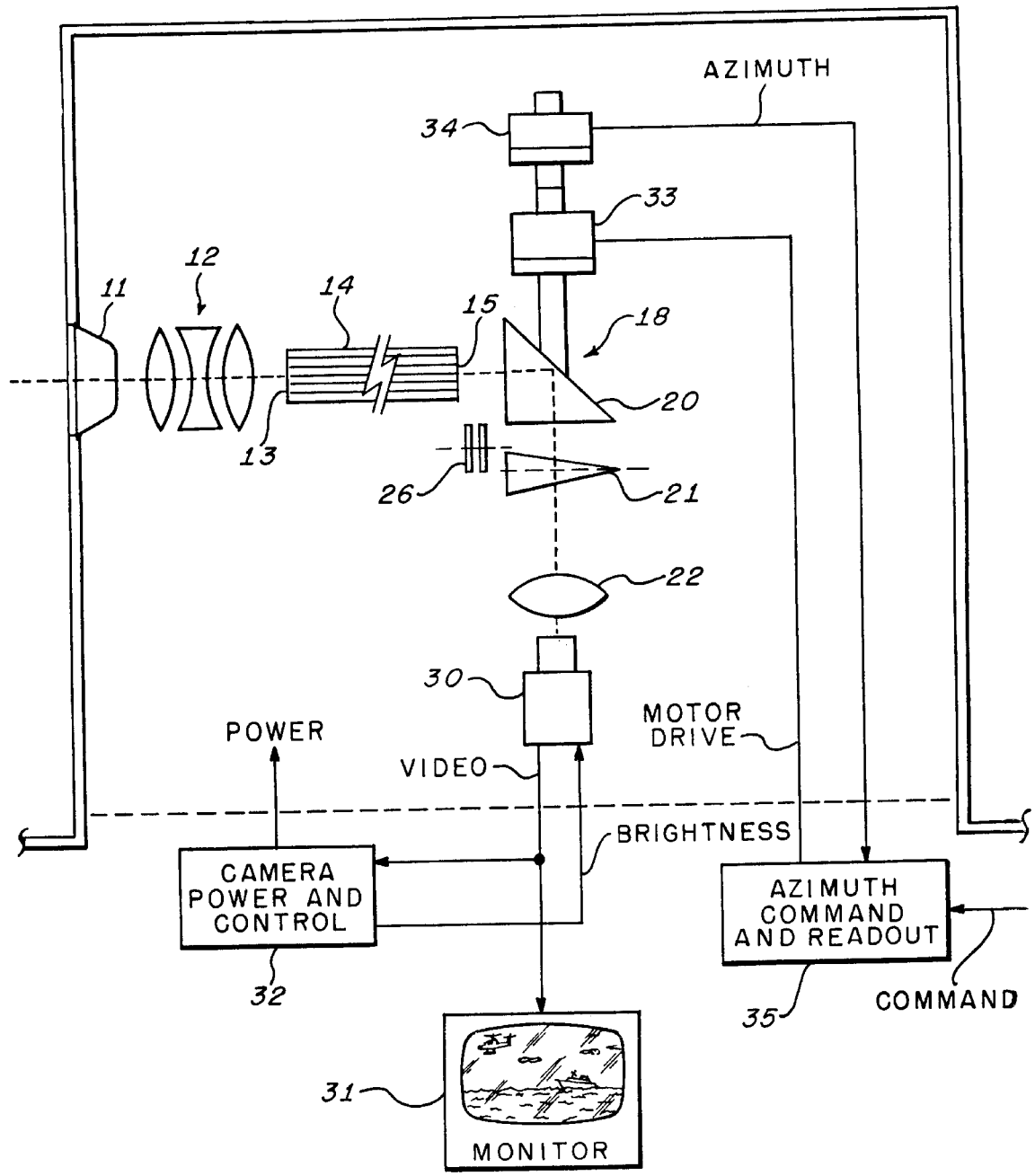
FIG. 4 is an elevation view of the interior of the non-rotary submarine mast of FIG. 1 illustrating further details of the preferred embodiment of the invention.

Referring to FIG. 4, in which like reference numerals indicate like components with respect to FIGS. 1–3, an elevation view of the interior of an integrated system submarine mast including the panoramic visual system of the present invention is illustrated. The arrangement of FIG. 4 is illustrated without the image intensifier 23 and depicts a conventional electronic automatic light level control camera 30 receiving the real image from the relay lens 22. The camera 30 provides video signals to a monitor 31 that provides an image to an operator corresponding to the portion of the panoramic scene viewed by the rotatable image directing mirror or prism 20. Thus, an operator views the portion of the world of interest on the monitor 31. The video signals from the camera 30 are also applied to a camera power and control section 32 that provides the controls for the camera 30. The section 32 also provides power for the integrated electronic mast portion of the system.

A stepper motor 33 drives the directing mirror or prism 20 for various views of the outside world. The stepper motor 33 also drives the derotation prism 21 through the 2:1 gears 26, as well as driving a synchro 34. The synchro 34 provides an angular position reference for the directing mirror or prism 20 and provides the reference to an operator viewing the monitor 31. An azimuth command and read-out section 35 provides a position read-out for the synchro 34 and the drive control for the stepper motor 33.

It is appreciated from the foregoing, that the present invention provides continuous scanning and panning in a small, non-central, non-axial and possibly remote location in a non-rotating mast of a submarine. Only a small number of small diameter holes are required through the external surface of the mast and only one moving part is utilized providing reliability. By, for example, utilizing the low light level television camera of said U.S. Pat. No. 4,882,481, only one internal rotating element is required. Since fiber optic image bundle relays are now available in the 3–5 micrometer wave length range, infra-red systems may be utilized, as well as visual systems of the type described above. Extensions to 8–14 micron imaging, as well as other frequency bands, are also possible in accordance with newly developing image relay technologies.

Thus it is appreciated, that by utilizing the present invention, visual, panoramic and search capabilities can be added to small, rigid and non-rotating structures with minimal impact on the inner space thereof.

It is appreciated that all materials used to construct the panoramic visual system may be dielectric except where images enter the remotely located panoramic/camera assembly. Thus, the important materials sensitive internal volume of the signal gathering mast is not compromised.

While the invention has been described in its preferred embodiment, it is to be understood that the words which have been used are words of description rather than limitation and that changes may be made within the purview of the appended claims without departing from the true scope and spirit of the invention in its broader aspects.

What is claimed is:

1. A system for providing a panoramic scan of a scene comprising
    a plurality of lenses for providing optical images of adjacent fields of view of said scene, said optical images of said adjacent fields of view providing a continuous optical panoramic view of said scene,
    a plurality of coherent optical image guides, having respective entrance surfaces, said entrance surfaces respectively coupled to said plurality of lenses for coherently conveying said optical images from said entrance surfaces to exit surfaces respectively corresponding to said entrance surfaces,
    said exit surfaces arranged to establish thereon a continuous coherent optical replica of said panoramic view of said scene,
    said exit surfaces being arranged to form an opening having a continuous interior inwardly facing surface comprised of said exit surfaces, said continuous coherent optical replica of said panoramic view being disposed on said continuous interior surface of said opening; and
    scanning means for scanning said continuous coherent optical replica of said panoramic view on said exit surfaces,
    said scanning means comprising relay lens means, image director means rotatably disposed within said opening for scanning said continuous coherent optical replica of said panoramic view and directing a corresponding scanned optical image to said relay lens means and a television camera disposed to receive said scanned optical image from said relay lens means,
    thereby providing said panoramic scan of said scene.

2. The system of claim 1 wherein each said image guide comprises a coherent fiber optic bundle image relay.

3. The system of claim 1 wherein said plurality of lenses is disposed at equal distances around the periphery of a submarine mast.

4. The system of claim 3 wherein
    said system comprises a first portion disposed within said mast and a second portion disposed remotely from said first portion,
    said first portion comprising said plurality of lenses and said entrance surfaces of said image guides,
    said second portion comprising said exit surfaces of said image guides and said scanning means,
    said first portion being comprised of dielectric materials.

5. The system of claim 1 wherein said opening comprises a polygonal opening.

6. The system of claim 5 wherein said image director means comprises an image directing prism.

7. The system of claim 5 wherein said image director means comprises an image directing mirror.

8. The system of claim 5 further including an image intensifier disposed between said relay lens means and said television camera means.

9. The system of claim 5 wherein said scanning means further includes derotation means disposed between said image director means and said television camera means for compensating rotation imparted to said scanned image by said image director means.

10. The system of claim 9 wherein said derotation means comprises a derotating prism geared to said image director means by a 2:1 gear ratio so that said derotating prism rotates through one-half the angular displacement of said image director means.

* * * * *